United States Patent
Onoue

(10) Patent No.: US 7,557,467 B2
(45) Date of Patent: Jul. 7, 2009

(54) PORTABLE PHOTOGRAPHING APPARATUS AND POWER SWITCHING CONTROL METHOD

(75) Inventor: Yoichi Onoue, Tokyo (JP)

(73) Assignee: Sony Corporation, Tokyo (JP)

( * ) Notice: Subject to any disclaimer, the term of this patent is extended or adjusted under 35 U.S.C. 154(b) by 393 days.

(21) Appl. No.: 11/069,437

(22) Filed: Mar. 1, 2005

(65) Prior Publication Data
US 2005/0195625 A1 Sep. 8, 2005

(30) Foreign Application Priority Data
Mar. 2, 2004 (JP) .............................. 2004-057292

(51) Int. Cl.
H01H 47/00 (2006.01)
H02J 3/00 (2006.01)
H02J 7/00 (2006.01)

(52) U.S. Cl. ........................ 307/130; 307/75; 307/113

(58) Field of Classification Search ................... 307/75, 307/113, 130
See application file for complete search history.

(56) References Cited

U.S. PATENT DOCUMENTS

| | | | | |
|---|---|---|---|---|
| 5,583,384 A | * | 12/1996 | Henry | 307/113 |
| RE36,179 E | * | 4/1999 | Shimoda | 327/407 |
| 5,925,942 A | * | 7/1999 | Theobald | 307/125 |
| 6,140,801 A | * | 10/2000 | Aoki et al. | 320/132 |
| 6,803,745 B2 | * | 10/2004 | Nishida et al. | 320/112 |
| 6,850,039 B2 | * | 2/2005 | Popescu | 320/134 |
| 6,977,482 B2 | * | 12/2005 | Popescu-Stanesti et al. | 320/116 |
| 7,029,258 B2 | * | 4/2006 | Hidaka | 425/135 |
| 7,215,043 B2 | * | 5/2007 | Tsai et al. | 307/130 |
| 2002/0023235 A1 | | 2/2002 | Odaohhara | |

FOREIGN PATENT DOCUMENTS

| | | |
|---|---|---|
| EP | 0 747 957 | 9/1998 |
| EP | 1 447 897 | 8/2004 |
| GB | 2 392 324 | 2/2004 |

* cited by examiner

Primary Examiner—Albert W Paladini
Assistant Examiner—Hal I Kaplan
(74) Attorney, Agent, or Firm—Frommer Lawrence & Haug LLP; William S. Frommer; Thomas F. Presson

(57) ABSTRACT

A constant voltage regulator and registers R1 and R2 generate a reference voltage with at least one of voltages supplied from a battery and an AC adaptor. The reference voltage is supplied to a first input terminal of a comparator. An input voltage supplied from the AC adaptor and divided by registers R3 and R4 is supplied to a second input terminal of the comparator. The comparator compares the reference voltage with the input voltage. When the reference voltage is lower than the input voltage, an FET switch SW1 is turned on and power is supplied from the AC adaptor side. When the reference voltage is higher than the input voltage, an FET switch SW2 is turned on and power is supplied from the battery side.

3 Claims, 10 Drawing Sheets

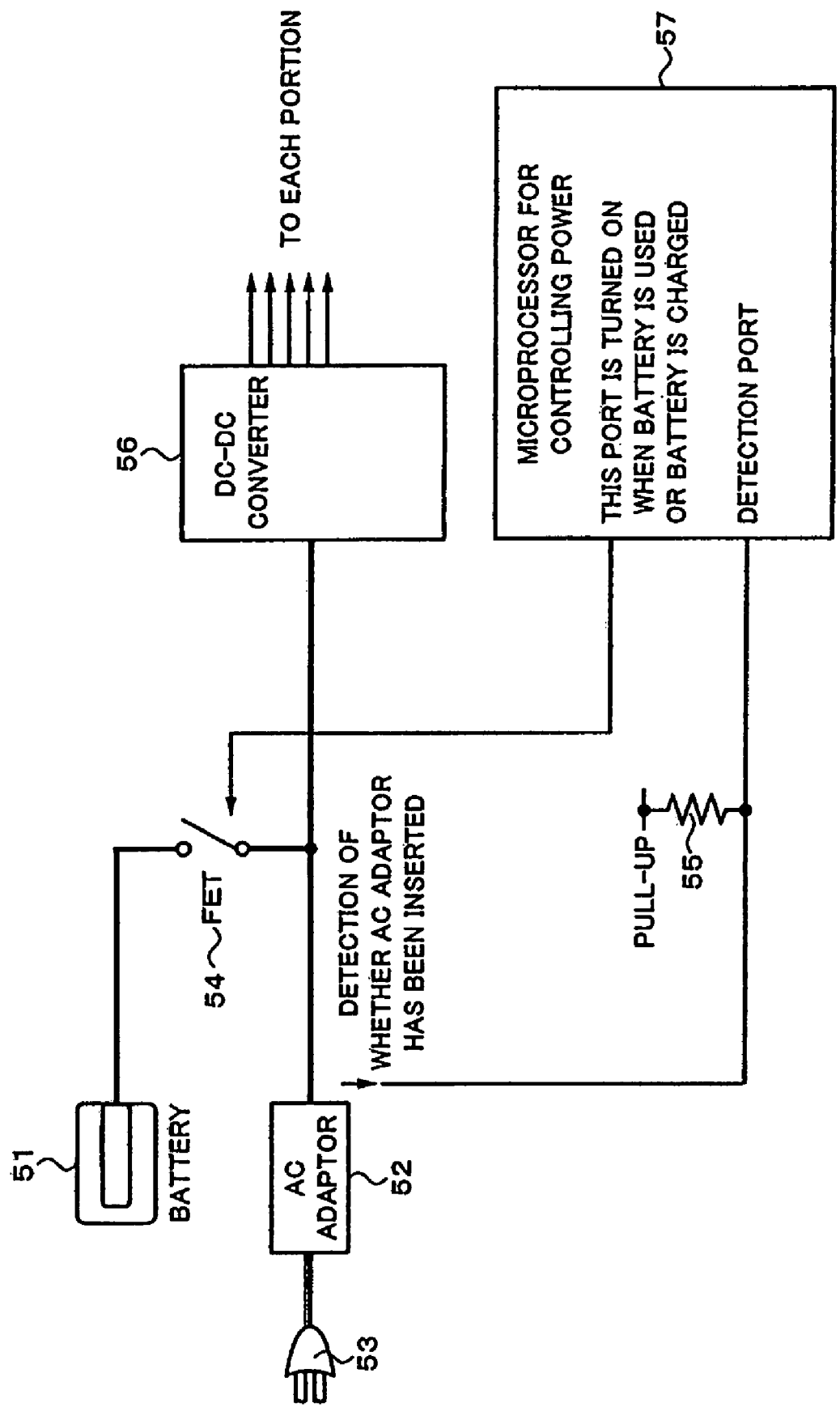

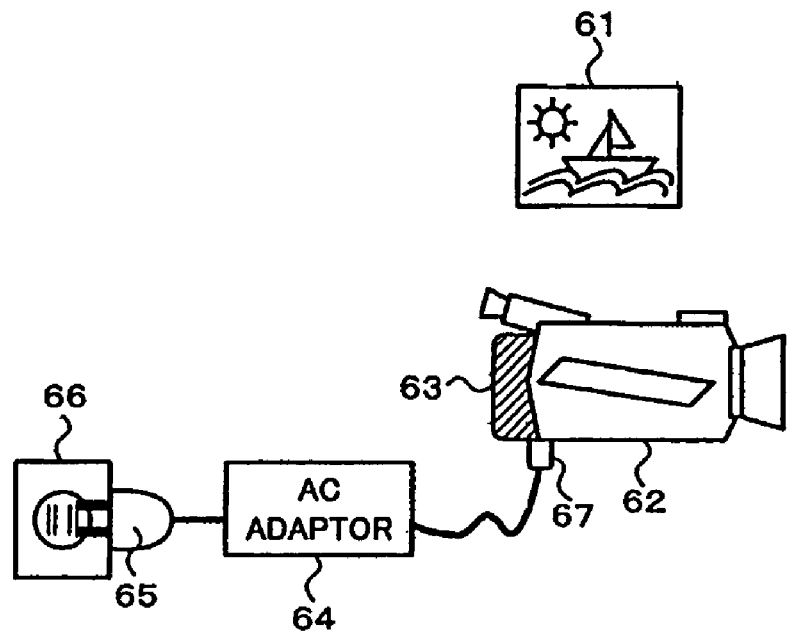
Fig. 2A
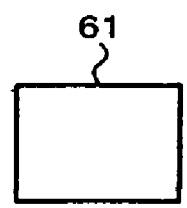
Fig. 2B
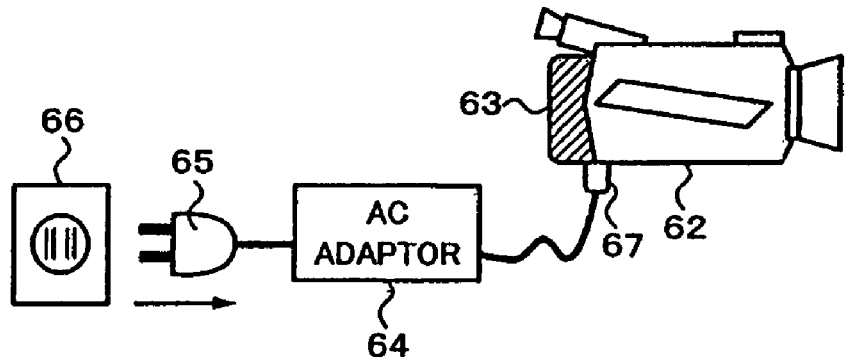

Fig. 3A
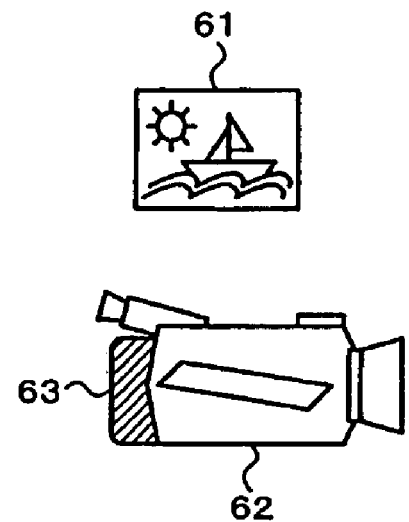
Fig. 3B
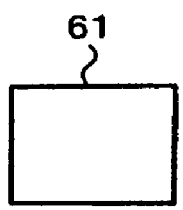
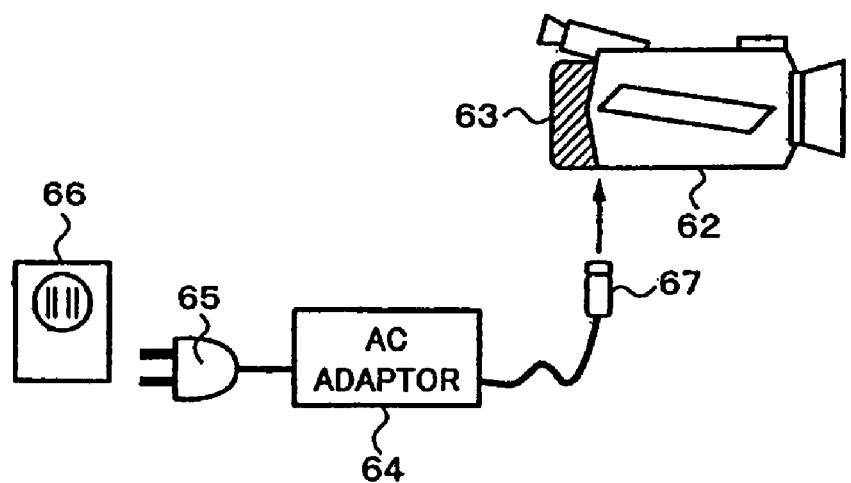

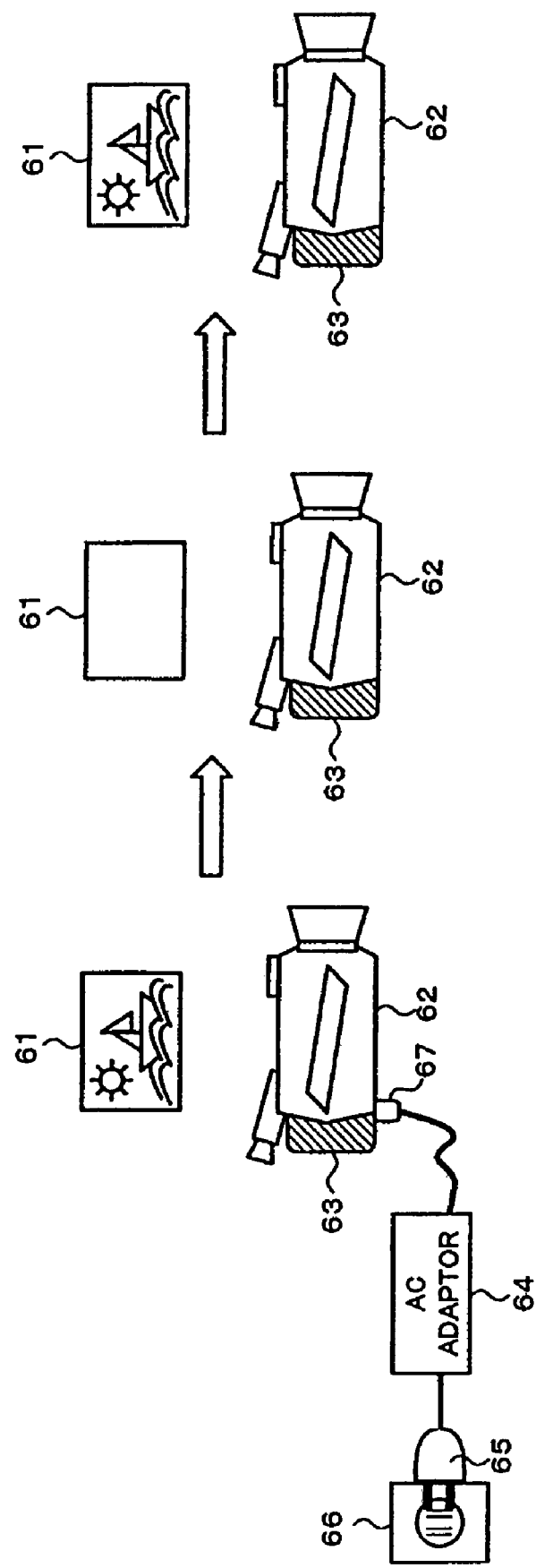

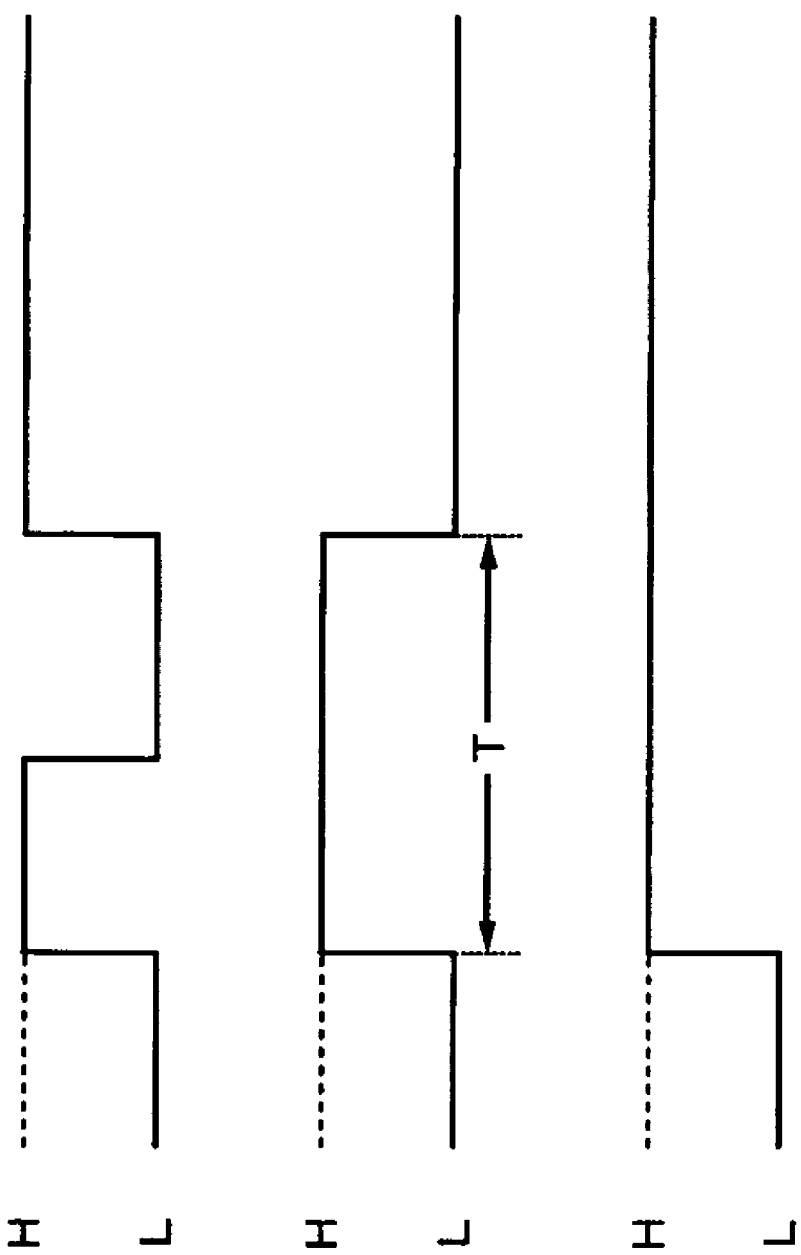

*Fig. 8A*
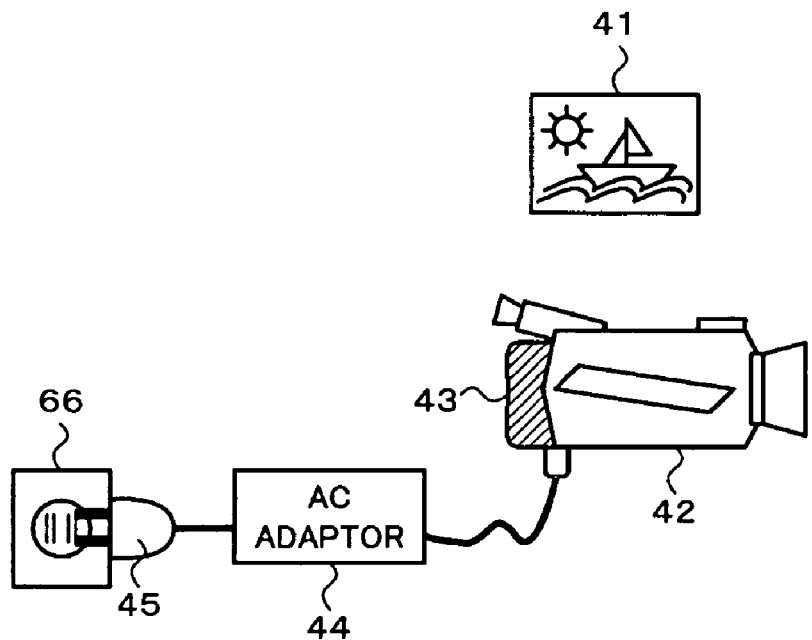
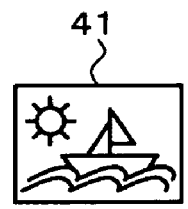
*Fig. 8B*
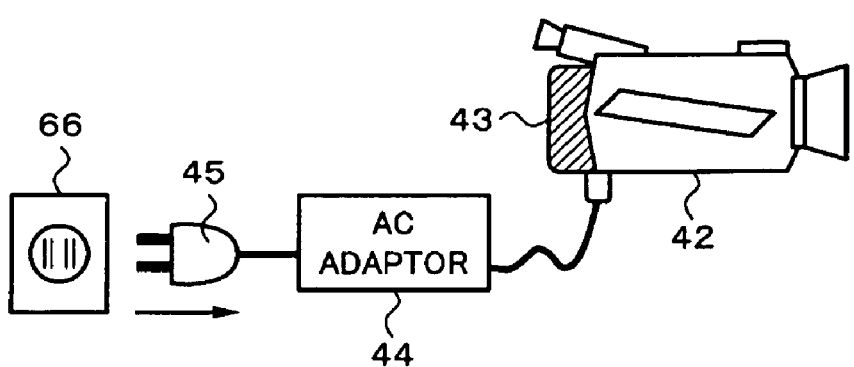

*Fig. 9A*
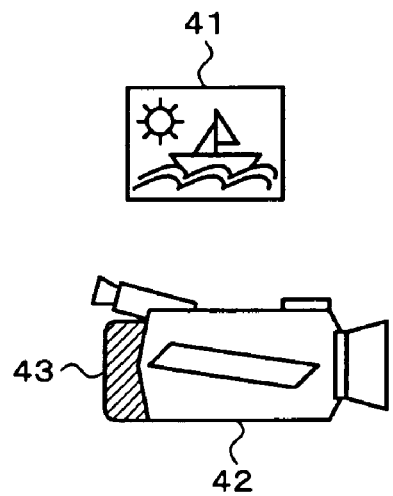
*Fig. 9B*
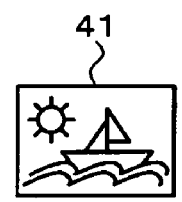
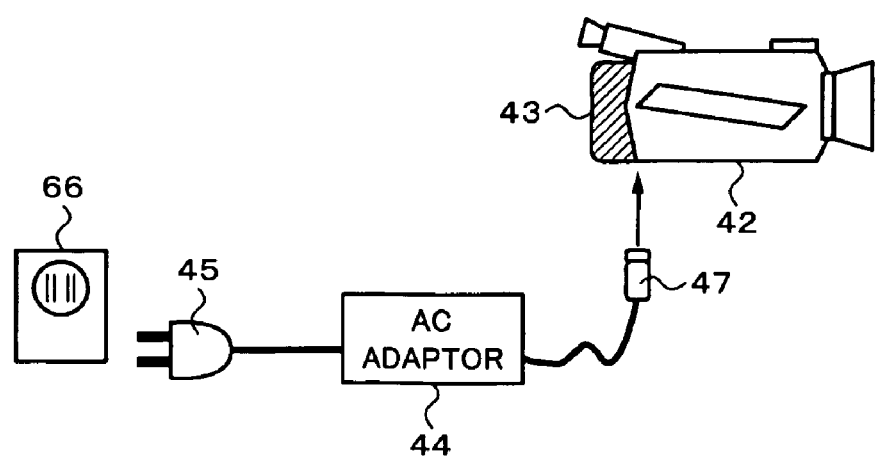

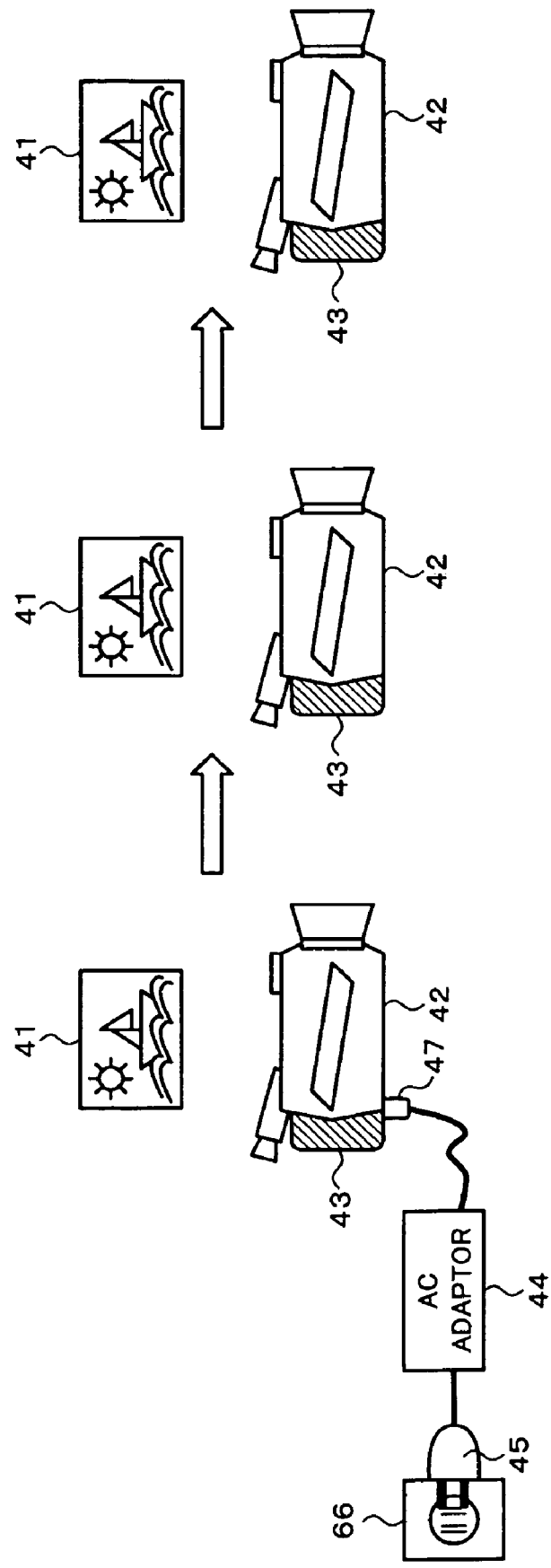

PORTABLE PHOTOGRAPHING APPARATUS AND POWER SWITCHING CONTROL METHOD

BACKGROUND OF THE INVENTION

1. Field of the Invention

The present invention relates to a portable photographing apparatus that uses power supplies of both an AC adaptor and a battery and to a power switching control method.

2. Description of the Related Art

In recent years, a portable photographing apparatus that can photograph people, scenes, and so forth and record them to an information recording medium (hereinafter this apparatus is referred to as the camcorder, which stands for camera and recorder) has been widespread. When the user uses the camcorder outdoors, he or she uses as its power supply a battery.

When the user uses the camcorder indoors or when the battery's remaining power becomes low, he or she needs to connect the camcorder to an AC adaptor that is connected to an AC outlet.

FIG. 1 shows an example of a power supply switching circuit used for the conventional camcorder. For convenience, FIG. 1 shows only a major circuit structure of the power supply switching circuit. Referring to FIG. 1, a battery 51 and an AC adaptor 52 are connected to a DC-DC converter 56. The DC-DC converter 56 supplies power to each portion of the camcorder. The AC adaptor 52 is connected to an AC outlet of a commercial AC power supply. When both the battery 51 and the AC adaptor 52 have been connected to the camcorder, the AC adaptor 52 is used with a priority over the battery 51 to reduce the power consumption thereof.

A microprocessor 57 controls the power supplied to the camcorder. Hereinafter, the microprocessor 57 is referred to as the microcomputer 57. The microcomputer 57 causes a switch disposed on the battery side, for example an FET switch 54, to be turned on and off. When power is supplied from the battery 51 to the DC-DC converter 56, the FET switch 54 is turned on.

In addition, the microcomputer 57 determines whether or not a plug (not shown) of the AC adaptor 52 has been inserted into the camcorder. When the plug of the AC adaptor 52 has not been inserted into the camcorder, a DC voltage supplied through a pull-up resistor 55 causes the level of a detection port of the microcomputer 57 to become the high level (this level is hereinafter referred to as H).

When the plug of the AC adaptor 52 is inserted into the camcorder, a DC voltage terminal is grounded through the pull-up resistor 55. As a result, the level of the detection port of the microcomputer 57 becomes the low level (hereinafter properly referred to as L). The microcomputer 57 can determine whether or not the plug of the AC adaptor 52 is inserted into the camcorder in such a manner that when the plug of the AC adaptor 52 is pulled out of the camcorder, the level of the detection port of the microcomputer 57 changes from L to H. In such a manner, the microcomputer 57 mechanically determines whether or not the plug of the AC adaptor 52 has been inserted into or pulled out of the camcorder. However, the microcomputer 57 does not determine whether or not power is supplied from the AC adaptor 52 to the camcorder.

The following patent document 1 describes a power supply switching method for an adaptor and an internal power supply having a rechargeable battery.

Patent Document 1: Japanese Patent Laid-Open Publication No. 2000-75970

However, this power supply switching circuit has the following drawback. In this power supply switching circuit, the process of the microcomputer 57 is performed by software. Thus, the FET switch 54 cannot be instantaneously turned on and off. In other words, immediately after the plug of the AC adaptor 52 is pulled out of the camcorder, the FET switch 54 cannot be instantaneously turned on so as to switch the power supply from the AC adaptor 52 to the battery 51.

In addition, the microcomputer 57 does not determine whether or not a plug 53 of the AC adaptor 52 has been inserted into the AC outlet. Thus, even if the plug 53 has not been inserted into the AC outlet, when the DC plug of the AC adaptor 52 is inserted into the camcorder, the power supply for the camcorder is switched to the AC adapter 52 side. As a result, power is not supplied to the camcorder.

FIG. 2A and FIG. 2B show an example of an operation state of a conventional camcorder 62. As shown in FIG. 2A, a display portion 61 of the camcorder 62 displays a picture that the camcorder 62 will photograph. A battery 63 has been attached to the camcorder 62. In addition, a plug 67 of an AC adaptor 64 has been inserted into the camcorder 62. Moreover, a plug 65 of an AC adaptor 64 has been inserted into an AC outlet 66.

When the plug 65 is pulled out of the AC outlet 66, as shown in FIG. 2B, the operation of the camcorder 62 stops. Thus, the display portion 61 displays no picture. Since the plug 67 of the AC adaptor 64 has been inserted into the camcorder 62, a microcomputer of the camcorder 62 selects the AC adaptor side. However, since the plug 65 of the AC adaptor 64 has not been inserted into the AC outlet 66, power is not supplied to the camcorder 62. As a result, the operation of the camcorder 62 stops.

FIG. 3A and FIG. 3B show another operation state of the camcorder 62. As shown in FIG. 3A, the camcorder 62 has only the battery 63. The display portion 61 displays a picture that the camcorder 62 will photograph. When the plug 65 of the AC adaptor 64 has not been connected to the AC outlet 66, if the plug 67 of the AC adaptor 64 is inserted into the camcorder 62, the operation of the camcorder 62 stops and the display portion 61 displays no picture as shown in FIG. 3B. In other words, when the plug 67 of the AC adaptor 64 is inserted into the camcorder 62, the AC adaptor is selected. However, since the plug 65 of the AC adaptor 64 has not been inserted into the AC outlet 66, power is not supplied to the camcorder 62.

FIG. 4A, FIG. 4B, and FIG. 4C show a further operation state of the camcorder 62. As shown in FIG. 4A, the battery 63 has been attached to the camcorder 62. In addition, power has been supplied to the camcorder 62 from the AC adaptor 64 connected to the AC outlet 66. When the plug 67 is pulled out of the camcorder 62 in the state shown in FIG. 4A, the operation of the camcorder 62 instantaneously stops and the display portion 61 displays no picture as shown in FIG. 4B. Thereafter, as shown in FIG. 4C, power is supplied from the battery 63 to the camcorder 62. As a result, the camcorder 62 operates again. However, if this situation occurs in the recording mode, the camcorder 62 does not restore the recording mode.

When the plug 67 is pulled out of the camcorder 62, the microcomputer of the camcorder 62 selects the battery side. However, since the microcomputer cannot instantaneously operate the power supply switching circuit, the operation of the camcorder 62 instantaneously stops. When the battery side is selected and power is supplied from the battery 63 to the camcorder 62, its operation is resumed as shown in FIG. 4C.

The foregoing phenomenon can be prevented when the user takes care about the connection of the plug 67 to the camcorder 62. However, such a phenomenon may occur due to carelessness of another person. For example, when there is another person near the user, the person may catch his or her foot on a cord of the AC adaptor 64 and the plug 65 may be pulled out of the AC outlet 66. In particular, when pictures are recorded on an information recording medium such as an optical disc, since unfinished recording pictures cannot be recorded on the recording medium unlike a tape, a situation of which captured pictures have not been recorded on the recording medium may occur.

SUMMARY OF THE INVENTION

Therefore, an object of the present invention is to provide a portable photographing apparatus and a power supply switching control method that allow a power supply switching circuit to be instantaneously operated.

To solve the foregoing drawback, a first aspect of the present invention is a portable photographing apparatus having at least a first power supply terminal and a second power supply terminal, the first power supply terminal being connected to an AC adaptor, the second power supply terminal being connected to a battery, the apparatus comprising generating means for generating a reference voltage with at least one of voltages supplied from the first power supply terminal and the second power supply terminal; comparing means for comparing the input voltage supplied from the first power supply terminal with the reference voltage; and first and second switching devices connected to the first power supply terminal and the second power supply terminal, respectively, wherein when the input voltage and the reference voltage have been compared by the comparing means, if the input voltage is higher than the reference voltage, the first switching device is turned on and the second switching device is turned off, and if the input voltage is lower than the reference voltage, the first switching device is turned off and the second switching device is turned on.

A second aspect of the present invention is a power supply switching control method for a portable photographing apparatus having at least a first power supply terminal and a second power supply terminal, the first power supply terminal being connected to an AC adaptor, the second power supply terminal being connected to a battery, a first switching device and a second switching device being connected to the first power supply terminal and the second power supply terminal, respectively, the method comprising the steps of: generating a reference voltage with at least one of voltages supplied from the first power supply terminal and the second power supply terminal; comparing the input voltage supplied from the first power supply terminal with the reference voltage; if the input voltage is higher than the reference voltage, turning on the first switching device and turning off the second switching device; and if the input voltage is lower than the reference voltage, turning off the first switching device and turning on the second switching device.

According to the present invention, when either the battery or the AC adaptor connected to the AC outlet has been connected to the portable photographing apparatus, its operation does not instantaneously stop. Thus, the user can use the portable photographing apparatus with natural operability.

According to the present invention, with the AC adaptor connected to the AC outlet, when the user operates the portable photographing apparatus for a long time, the battery can be replaced with another one without need to stop the operation of the portable photographing apparatus. In addition, the user can be prevented from loosing a chance to photograph a crucial scene.

These and other objects, features and advantages of the present invention will become more apparent in light of the following detailed description of a best mode embodiment thereof, as illustrated in the accompanying drawings.

BRIEF DESCRIPTION OF THE DRAWINGS

The invention will become more fully understood from the following detailed description, taken in conjunction with the accompanying drawings, wherein similar reference numerals denote similar portions, in which:

FIG. 1 is a block diagram showing an example of a circuit structure of a conventional portable photographing apparatus;

FIG. 2A and FIG. 2B are schematic diagrams showing an example of an operation state of a conventional portable photographing apparatus;

FIG. 3A and FIG. 3B are schematic diagrams showing another example of an operation state of a conventional portable photographing apparatus;

FIG. 4A, FIG. 4B, and FIG. 4C are schematic diagrams showing a further example of an operation state of a conventional portable photographing apparatus;

FIG. 7A, FIG. 7B, and FIG. 7C are schematic diagrams showing waveforms of output pulses;

FIG. 8A and FIG. 8B are schematic diagrams showing an example of an operation state of the portable photographing apparatus according to the present invention;

FIG. 9A and FIG. 9B are schematic diagrams showing another example of an operation state of the portable photographing apparatus according to the present invention; and FIG. 10A, FIG. 10B, and FIG. 10C are schematic diagrams showing a further example of an operation state of the portable photographing apparatus according to the present invention.

DETAILED DESCRIPTION OF THE PREFERRED EMBODIMENTS

Figure 5:
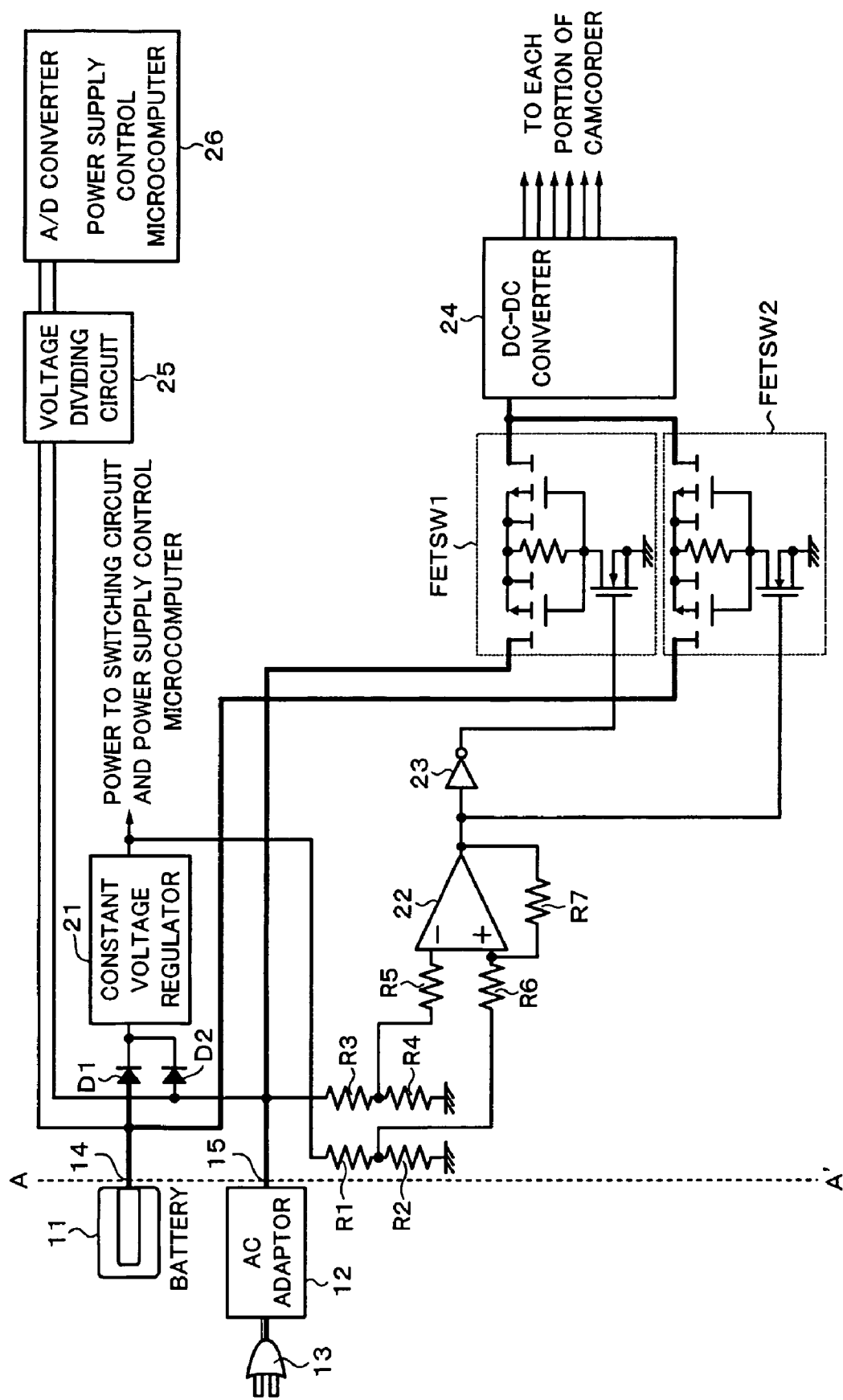
FIG. 5 is a circuit diagram showing an example of a circuit structure of a portable photographing apparatus according to the present invention.

Next, with reference to the accompanying drawings, an embodiment of the present invention will be described. According to the embodiment, it is assumed that the portable photographing apparatus is a camcorder. FIG. 5 shows an example of a power supply switching circuit that the camcorder according to the present invention has. In FIG. 5, the left side of broken line A-A' shown in FIG. 5 represents the exterior of the camcorder, whereas the right side thereof represents a circuit structure of the camcorder. In the camcorder, a power supply terminal designated by reference numeral 14 is connected to a battery 11. A power supply terminal designated by reference numeral 15 is connected to a plug of an AC adaptor 12.

In the circuit shown in FIG. 5, a reference voltage is generated with the voltage of the battery 11 and the voltage of the AC adaptor 12. The voltage of the battery 11 is supplied to a constant voltage regulator 21 through a diode D1. On the other hand, the voltage of the AC adaptor 12 is supplied to the constant voltage regulator 21 through a diode D2. The diode D1 and the diode D2 are disposed so as to prevent current from reversely flowing.

The constant voltage regulator 21 selects a higher voltage from the supplied voltages so as to generate the reference voltage. When one of the battery 11 and the AC adaptor 12 has not been connected to the camcorder, one voltage is considered to be 0 V. When both the battery 11 and the AC adaptor 12 have not been connected to the camcorder, since no power has supplied, the camcorder does not operate.

The constant voltage regulator 21 is for example a voltage drop type regulator of series regular type. The constant voltage regulator 21 generates an output voltage that is lower than an input voltage. The output voltage of the constant voltage regulator 21 is divided by a resistor R1 and a resistor R2 so as to generate the reference voltage. The reference voltage is supplied to a first input terminal of a comparator 22 through a resistor R6.

The voltage that is input from the AC adaptor 12 is divided by a resistor R3 and a resistor R4. The divided voltage is supplied to a second input terminal of the comparator 22 through a resistor R5. Hereinafter, the voltage of which the output voltage of the AC adaptor 12 is divided and input to the second input terminal of the comparator 22 is referred to as the input voltage.

The comparator 22 compares the reference voltage with the input voltage so as to determine whether or not there is the input voltage. When power has been supplied from the AC adaptor 12, the AC adaptor 12 side is used with a priority over the battery 11 so as to decrease its power consumption. Like the related art reference, according to this embodiment, the comparator 22 detects presence/absence of the input voltage and generates a power supply switching control signal.

When the input voltage is higher than the reference voltage as the compared result of the comparator 22, the output of the comparator 22 becomes L. In contrast, when the input voltage is lower than the reference voltage, the output of the comparator 22 becomes H. The comparator 22 has a resistor R7 so as to cause the output to have hysteresis.

The output of the comparator 22 is supplied to a gate of an FET switch SW2 connected to the power supply terminal 14 for the battery 11. In addition, the output of the comparator 22 is inverted by an inverter 23. The inverted output is supplied to a gate of an FET switch SW1 connected to the power terminal 15 of the AC adaptor 12.

When the levels of the gates of the FET switch SW1 and the FET switch SW2 become H, they are turned on. For example, when the level of the gate of the FET switch SW1 becomes H, the FET switch SW1 is turned on. As a result, power of the AC adaptor 12 is supplied to a DC-DC converter 24. At this point, the level of the gate of the FET switch SW2 becomes L. As a result, the FET switch SW2 is turned off.

In the FETSW1 (FETSW2) of FIG. 5, an electric current flows from the left direction to the right direction through two FETs when one of the two FETs turns on.

Two FETs are connected face-to-face with each other in FETSW1 and FETSW2. In the left FET (P channel FET) a current flows from a drain to a source and in the right FET (P channel FET) a current flows from a source to a drain. Since a parasitic diode may exist inside most MOSFETs, in P channel FET an electric current can flow from a drain to a source even when it is in an "off" state. It is usually enough to use one FET as an electric current switch (like the right FET). However, in a case, namely, where two currents flow from two power supplies are switched by FETSW1 and FETSW2 that are used for a common input terminal, each of FETSW1 and FETSW2 has two face-to-face FETs respectively since in each of FETSW an electric current turned around from the other FETSW is prevented. Hence, when one FETSW is turned off, the parasitic diodes of the FET (left side) can prevent to flow any reverse current from the other FETSW completely.

In addition, a resistor is connected between sources and gates of two FETs so that it is expected to be used as a bias through the parasitic diode.

Table 1 shows the states of the FET switch SW1 and the FET switch SW2 according to the embodiment.

TABLE 1

| | AC Adaptor | Battery | Comparator | Inverter | SW1 | SW2 |
|---|---|---|---|---|---|---|
| (1) | X | X | Camcorder does not operate. | | | |
| (2) | O | X | L | H | ON | OFF |
| (3) | X | O | H | L | OFF | ON |
| (4) | O | O | L | H | ON | OFF |

In the AC adaptor column, O represents that the plug of the AC adaptor 12 has been inserted into the camcorder, that the plug 13 has been inserted into the AC outlet, and that power has been supplied from the AC adaptor 12. X represents that the plug 13 has not been inserted into the AC outlet, and/or that the plug of the AC adaptor 12 has not been inserted into the camcorder, and that power has not been supplied from the AC adaptor 12.

Likewise, in the battery column, O represents that the battery 11 has been attached to the camcorder and that power has been supplied. X represents that the battery 11 has not been attached to the camcorder.

In Table 1, state (1) represents that both the voltages of the AC adaptor 12 and the battery 11 are 0V. In this case, the camcorder does not operate.

In state (2), only the AC adaptor 12 connected to the AC outlet has been connected to the camcorder. The constant voltage regulator 21 and the resistors R1 and R2 generate the reference voltage with the voltage of the AC adaptor 12. The reference voltage is supplied to the first input terminal of the comparator 22. Supplied to the second input terminal of the comparator 22 is the input voltage of which the voltage of the AC adaptor 12 has been divided by the resistors R3 and R4. Since the input voltage and the reference voltage have been set so that the former is higher than the latter, the output of the comparator 22 becomes L.

The output, L, of the comparator 22 is supplied to the gate of the FET switch SW2. The output, L, causes the FET switch SW2 to be turned off. In addition, the output, L, of the comparator 22 is inverted into H by the inverter 23. The output, H, is supplied to the gate of the FET switch SW1. The output, H, cause the FET switch SW1 to be turned on. When the FET switch SW1 is turned on, power is supplied from the AC adaptor 12 side to the DC-DC converter 24.

State (3) represents that power has been supplied from only the battery 11 to the camcorder. The constant voltage regulator 21 and the resistor R1 and R2 generate the reference voltage with the voltage of the battery 11. Since the voltage of the AC adaptor 12 is 0V, the input voltage becomes lower than the reference voltage. Thus, the output of the comparator 22 becomes H.

The output, H, of the comparator 22 is supplied to the gate of the FET switch SW2. Since the input of the FET switch SW2 is H, the FET switch SW2 is turned on. Thus, power of the battery 11 is supplied to the DC-DC converter 24. In addition, the output, H, of the comparator 22 is inverted to L by the inverter 23 and supplied to the gate of the FET switch SW1. Since the input of the FET switch SW1 is L, it is turned off.

State (4) represents that both the battery 11 and the AC adaptor 12 have been connected to the camcorder. When both the battery 11 and the AC adaptor 12 have been connected to the camcorder, the AC adaptor 12 side is used with a priority over the battery 11 side.

Since the voltage of the AC adaptor 12 is higher than the voltage of the battery 11, the constant voltage regulator 21 generates the reference voltage with the voltage of the AC adaptor 12. Since the input voltage compared with the reference voltage by the comparator 22 is the same, the output of the comparator 22 becomes L like state (2).

Since the output of the comparator 22 is L, the output of the inverter becomes H. The output, H, causes the FET switch SW1 to be turned on. The output, L, cause the FET switch SW2 to be turned off. As a result, power of the AC adaptor 12 side is supplied to the DC-DC converter 24. In other words, when the power is supplied from both the battery 11 and the AC adaptor 12 to the camcorder, the AC adaptor side is selected and power thereof is supplied to the DC-DC converter 24.

As circuit constants, in the case that the output voltage (reference voltage) of the constant voltage regulator 21 is 3 V and that R1, R2, R3, R4 (R5 and R6), and R7 are R1=10 K.OMEGA., R2=39 K.OMEGA., R3=220 K.OMEGA., R4 (R5 and R6)=100 K.OMEGA., and R7=1 M.OMEGA., when the voltage of the AC adaptor 12 is 7.81 V or higher, the level of the output of the comparator 22 becomes L. In this case, when the voltage of the AC adaptor 12 is lower than 6.95 V, the level of the output of the comparator 22 becomes H.

The power supply switching circuit is composed of hardware rather than a conventional software process. Thus, power supplied to the camcorder can be instantaneously switched between the battery side and the AC adaptor side.

In addition, the power supply switching circuit according to this embodiment has a power supply control microcomputer 26 that has a port to which power is supplied through a voltage dividing circuit 25. The port is connected to the power supply terminal 14 for the battery 11. The power supply control microcomputer 26 measures for example the remaining power of the battery 11 and displays the measured result on the display portion.

In addition, the port of the power supply control microcomputer 26 is connected to the power supply terminal 15 for the AC adaptor 12. The power supply control microcomputer 26 monitors for example the voltage of the AC adaptor 12. When the monitored voltage of the AC adaptor 12 is not normal, the power supply control microcomputer 26 determines that the AC adaptor 12 should be abnormal and displays a relevant message on the display portion.

The voltage dividing circuit 25 divides the voltages of the battery 11 and the AC adaptor 12 so that they do not exceed the maximum input range of the A/D port.

The reference voltage generated by the constant voltage regulator 21 is also supplied to the power supply control microcomputer 26. Even if the DC-DC converter 24 that supplies power to each circuitry throughout the camcorder does not operate, since the power supply control microcomputer 26 should measure the remaining power of the battery 11 and detects abnormality of the camcorder, the reference voltage is supplied to the power supply control microcomputer 26.

Figure 6:
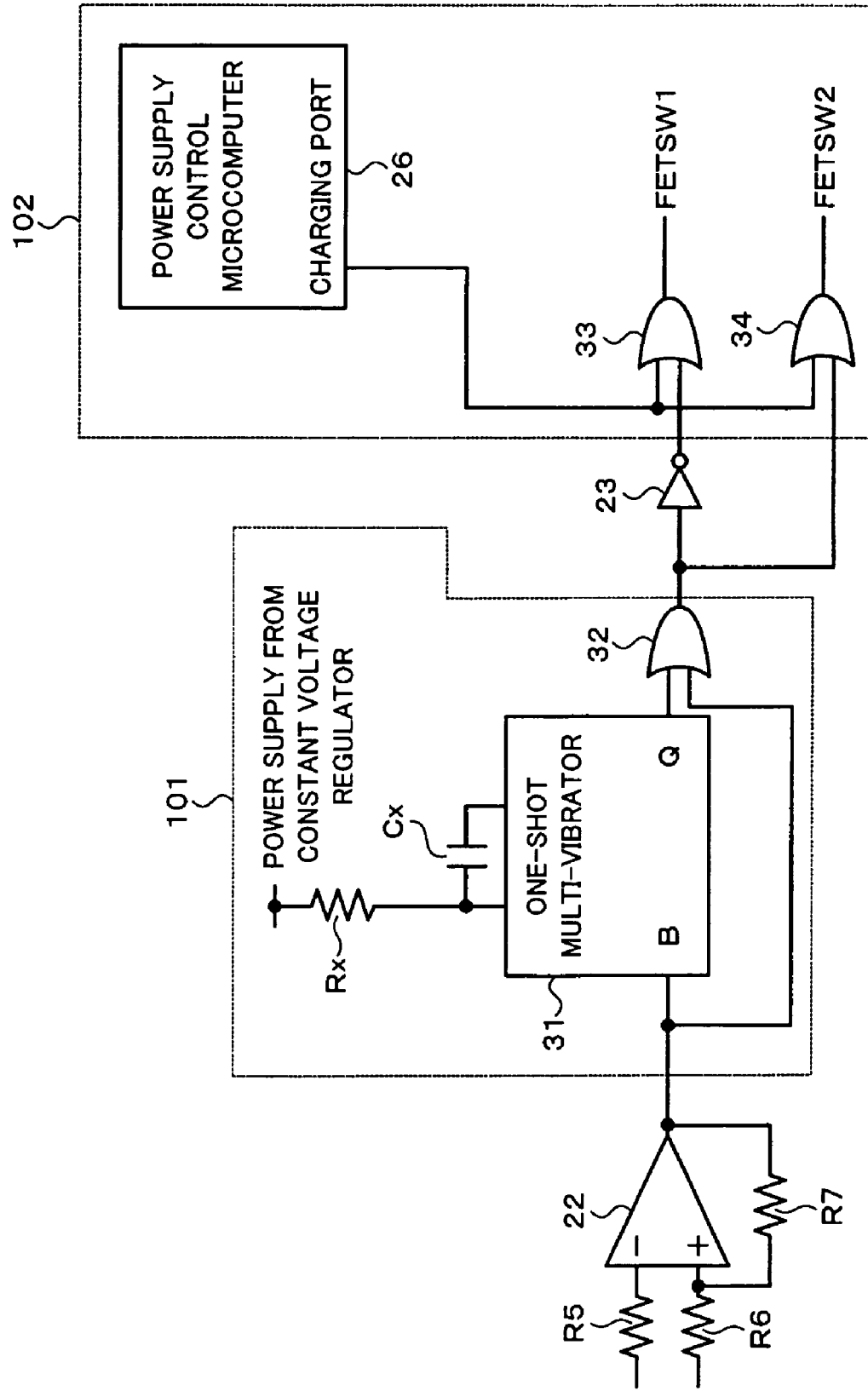
FIG. 6 is a circuit diagram showing another example of a circuit structure of the portable photographing apparatus according to the present invention.

FIG. 6 shows an example of a modification of the foregoing embodiment. When the FET switch SW1 and the FET switch SW2 are operated, depending on the operation speed of the circuit, there is a period at which both the FET switches are instantaneously turned on. In the state that the battery 11 has been attached to the camcorder, immediately after the AC adaptor 12 is disconnected from the camcorder, if both the FET switches are turned on, the voltage of the battery 11 reaches the power supply terminal for the AC adaptor 12 through the FET switch SW2 and the FET switch SW1. As a result, the power supply control microcomputer 26 may have determined that power of the AC adaptor 12 is supplied to the camcorder.

When the power supply control microcomputer 26 has determined that the AC adaptor 12 is connected to the camcorder, the FET switch SW1 is turned on and the FET switch SW2 is turned off. However, since the AC adaptor 12 is not actually connected to the camcorder, the power supply control microcomputer 26 determines that the AC adaptor 12 is not connected. Since this state is repeated, the FET switch SW1 and the FET switch SW2 are operated at high speed.

To prevent the power supply control microcomputer 26 from mistakenly determining that the AC adaptor 12 is connected, even if the AC adaptor 12 has been disconnected from the camcorder, the FET switch SW1 is unconditionally turned off for a predetermined period. A circuit surrounded by broken lines 101 in FIG. 6 is an example of a control circuit that unconditionally turns off the FET switch SW1. A one-shot multi-vibrator 31 is disposed on the output side of the comparator 22. An output of the one-shot multi-vibrator 31 and the output of the comparator 22 are input to an OR gate 32.

FIG. 7A shows a pulse waveform of the output of the comparator 22, namely the input of the one-shot multi-vibrator 31. FIG. 7B shows a pulse waveform of an output of the one-shot multi-vibrator 31. FIG. 7C shows a pulse waveform of an output of the OR gate 32.

In FIG. 7A, initially, since both the battery 11 and the AC adaptor 12 have been connected to the camcorder, the level of the output of the comparator 22 is L. When the AC adaptor 12 is disconnected from the camcorder, the level of the output of the comparator 22 becomes H. However, when the power supply control microcomputer 26 mistakenly determines that the AC adaptor 12 should have been connected to the camcorder, the output level of the comparator 22 repeatedly changes between H and L.

When an input pulse of the one-shot multi-vibrator 31 is triggered, the level of the output pulse changes from L to H. For a predetermined period denoted by T, the level of the input pulse is kept H. The predetermined period T for which the level of the pulse is kept H depends on a resistor Rx and a capacitor Cx of the one-shot multi-vibrator 31.

Since the OR gate 32 obtains a logical disjunction of the output of the comparator 22 and the output of the one-shot multi-vibrator 31, the output of the OR gate 32 is free of noise as shown in FIG. 7C. The output of the OR gate 32 allows the FET switch SW1 and the FET switch SW2 to be stably operated.

A circuit surrounded by dotted lines denoted by reference numeral 102 is an example of a circuit that charges the battery 11 with the power supplied from the AC adaptor 12. The charging port for the power supply control microcomputer 26 is connected to a first input of an OR gate 33 and a first input of an OR gate 34. A second input of the OR gate 33 is connected to the inverter 23. A second input of the OR gate 34 is connected to the output of the OR gate 32. An output of the OR gate 33 is supplied to the gate of the FET switch SW1. An output of the OR gate 34 is supplied to the gate of the FET switch SW2.

When the camcorder is in the charging mode, the level of the charging port for the power supply control microcomputer 26 is H. Since the first inputs of the OR gates 33 and 34 become H, the outputs of the OR gates 33 and 34 become H. As a result, both the FET switch SW1 and the FET switch SW2 are turned on.

When both the FET switch SW1 and the FET switch SW2 are turned on, since the voltage of the AC adaptor 12 is higher than the voltage of the battery 11, the voltage of the AC adaptor 12 is supplied to the battery 11 through the FET switch SW1 and the FET switch SW2 and the battery 11 is charged with the voltage. The voltages of the AC adaptor 12 and the battery 11 are identified by the power supply control microcomputer 26. When the battery 11 has been charged with the voltage of the AC adaptor 12, the level of the charging port becomes L. In the charging mode, power of the camcorder is turned off. The display portion displays no picture.

Next, effects of the power supply switching circuit according to the embodiment of the present invention will be described. FIG. 8A and FIG. 8B show an example of an operation state of a camcorder 42. FIG. 8A shows that the camcorder 42 to which a battery 43 has been attached is operated with power supplied from an AC adaptor 44. In the state shown in FIG. 8A, even if a plug 45 of the AC adaptor 44 is disconnected from an AC outlet of a commercial power supply 66 due to any cause, power supplied to the camcorder 42 is instantaneously switched to the battery side. As a result, power is supplied from the battery 43 to the camcorder 42. Thus, as shown in FIG. 8B, the operation of the camcorder 42 does not stop. A display portion 41 continuously displays a picture that the camcorder will photograph.

FIG. 9A and FIG. 9B show another operation state of the camcorder 42. FIG. 9A shows the camcorder 42 which is operated with power supplied from the battery 43. When a plug 47 of the AC adaptor 44 that is not connected to the AC outlet is inserted into the camcorder 42 that is being operated, as shown in FIG. 9B, the operation of the camcorder 42 does not stop. In this case, even if the plug 47 of the AC adaptor is inserted into the camcorder 42, since the voltage of the AC adaptor 44 is 0 V, power supplied to the camcorder 42 is not switched from the battery 43 to the AC adaptor 44. Thus, power of the battery 43 is still supplied to the camcorder 42.

FIG. 10A and FIG. 10B show a further operation state of the camcorder 42. FIG. 10A shows the camcorder 42 which is operated with power supplied from the AC adaptor 44. Although the battery 43 has been attached to the camcorder 42, power supplied from the AC adaptor 44 is used with a priority over power supplied from the battery 43.

As shown in FIG. 10B, even if the plug 47 of the AC adaptor 44 is pulled out of the camcorder 42, the operation of the camcorder 42 does not stop. As shown in FIG. 10C, the operation of the camcorder 42 continues. In this case, when the plug 47 is pulled out of the camcorder 42, it is determined that the voltage supplied from the AC adapter is 0 V. As a result, power supplied to the camcorder 42 is instantaneously switched to the battery side. Since power supplied to the camcorder is instantaneously switched between the AC adaptor side and the battery side by a hardware process, power supplied to the camcorder 42 does not instantaneously stop.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, according to the foregoing embodiment, the generated reference voltage and the input voltage are compared by the comparator 22. However, they can be compared by an interrupt process of software.

What is claimed is:

1. A portable photographing apparatus having at least a first power supply terminal and a second power supply terminal, the first power supply terminal being connected to an AC adaptor, the second power supply terminal being connected to a battery, the apparatus comprising:

generating means for generating a reference voltage with at least one of voltages supplied from the first power supply terminal and the second power supply terminal;

comparing means for comparing an input voltage supplied from the first power supply terminal with the reference voltage;

dividing means for dividing the input voltage of the first power supply terminal and the input voltage of the second power supply terminal and outputting divided voltages;

controlling means for controlling the portable photographing apparatus;

a first switching device connected to the first power supply terminal, wherein the first switching device comprises an FET and a mechanical portion comprising two face-to-face connected FETs and a resistor; and a second switching device connected to the second power supply terminal, wherein the second switching device comprises an FET and a mechanical portion comprising two face-to-face connected FETs and a resistor, wherein when the input voltage and the reference voltage have been compared by the comparing means, if the input voltage is higher than the reference voltage, the first switching device is turned on and the second switching device is turned off, and if the input voltage is lower than the reference voltage, the first switching device is turned off and the second switching device is turned on, wherein the controlling means receives the divided voltages directly from the dividing means and the reference voltage directly from the generating means without being affected by the first switching means and the second switching means, and wherein when the first power supply terminal is disconnected from the AC adaptor, the first switching device is unconditionally turned off for a predetermined period.

2. The portable photographing apparatus as set forth in claim 1, wherein the first and second switching devices are turned on with the voltage supplied from the first power supply terminal and the battery is charged with the voltage.

3. A power supply switching control method for a portable photographing apparatus having at least a first power supply terminal and a second power supply terminal, the first power supply terminal being connected to an AC adaptor, the second power supply terminal being connected to a battery, a first switching device and a second switching device being connected to the first power supply terminal and the second power supply terminal, respectively, the method comprising the steps of:

generating a reference voltage with at least one of voltages supplied from the first power supply terminal and the second power supply terminal by using generating means;

comparing an input voltage supplied from the first power supply terminal with the reference voltage;

dividing the input voltage of the first power supply terminal and the input voltage of the second power supply terminal and outputting divided voltages;

controlling the portable photographing apparatus;

if the input voltage is higher than the reference voltage, turning on the first switching device and turning off the second switching device;

if the input voltage is lower than the reference voltage, turning off the first switching device and turning on the second switching device;

receiving the divided voltages, at a controlling circuit, directly from a dividing circuit; and receiving the reference voltage, directly from a generating unit, without being affected by the first switching step and the second switching step, wherein when the first power supply terminal is disconnected from the AC adaptor, the first switching device is unconditionally turned off for a predetermined period, wherein the first switching device comprises an FET and a mechanical portion comprising two face-to-face connected FETs and resistor, and wherein the second switching device comprises an FET and a mechanical portion comprising two face-to-face connected FETs and a resistor.

* * * * *